Figure 1:
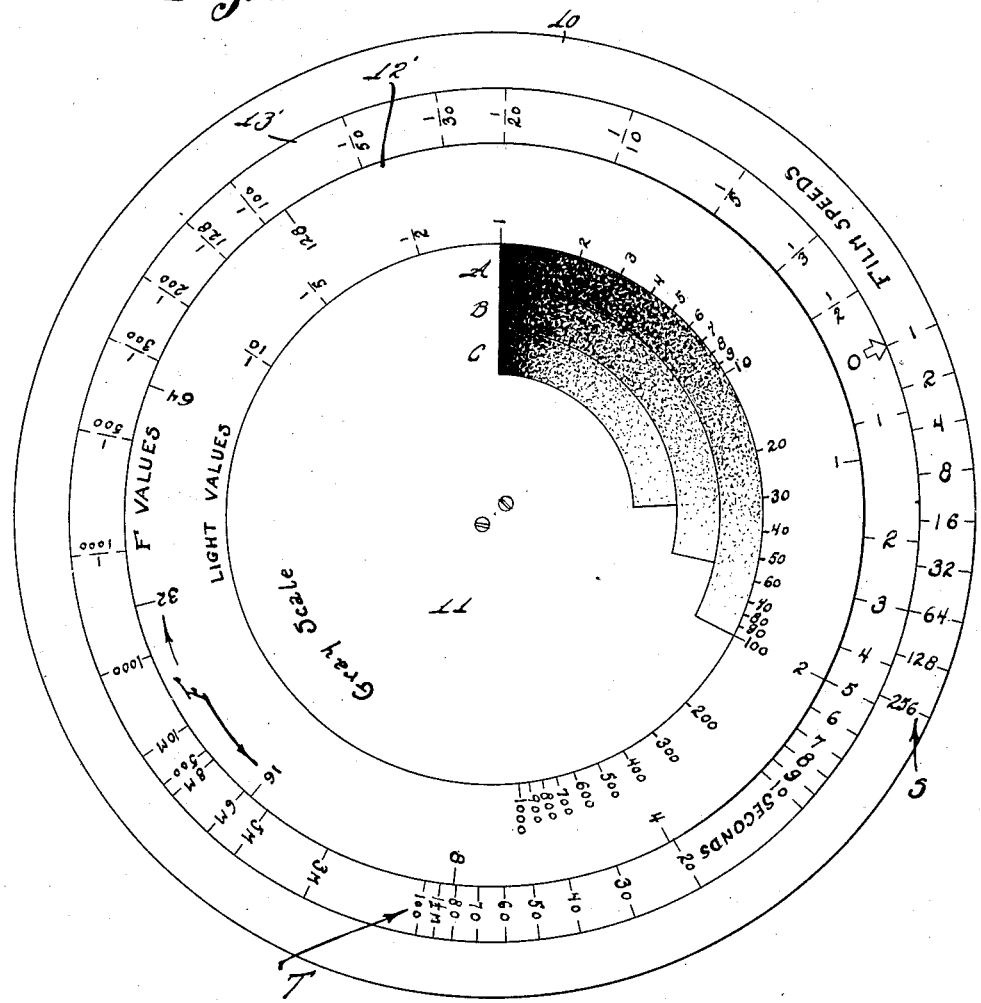

June 2, 1942.  R. WEAVER  2,284,783
PHOTOGRAPHER'S EXPOSURE INDICATOR
Filed Aug. 19, 1939  2 Sheets-Sheet 1

INVENTOR.
Richard Weaver,
BY
Hood & Hahn
ATTORNEYS.

June 2, 1942.                R. WEAVER                 2,284,783
                    PHOTOGRAPHER'S EXPOSURE INDICATOR
                       Filed Aug. 19, 1939        2 Sheets-Sheet 2
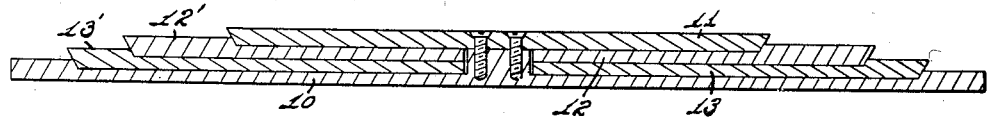
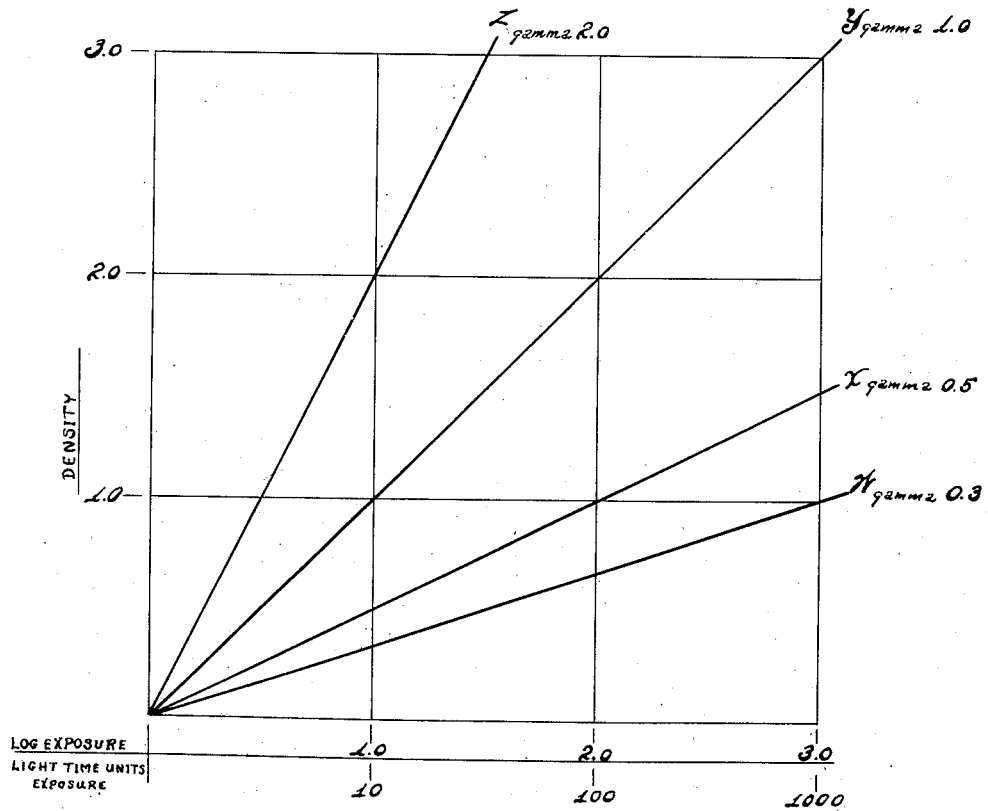
                                          INVENTOR.
                                       Richard Weaver,
                              BY
                                          ATTORNEYS

UNITED STATES PATENT OFFICE 2,284,783

PHOTOGRAPHER'S EXPOSURE INDICATOR

Richard Weaver, Indianapolis, Ind.

Application August 19, 1939, Serial No. 290,989

4 Claims. (Cl. 235—84)

The character of a photographic positive print is, of course, dependent upon the character and "scale" of the positive material and upon the character of the negative through which light must pass to the positive material.

The "scale" of the positive material may be indicated by its manufacturer, or is generally determined experimentally by its user.

The character of the negative is dependent upon the "speed" or sensitivity of the unexposed material, the intensity of light sources, the aperture of the camera lens (i. e., the "$f$" value), the shutter speed (exposure time), and the contrast and speed of the developer.

It is well known that with a given light source, any specific density in a negative may be obtained through a wide range of exposure times by a proper adjustment of the lens aperture and that the maximum negative density for any quanta of exposure may also be varied through quite wide limits by proper adjustment of the development time, temperature, and chemical activity.

The object of my invention is to produce a device comprising a series of co-ordinable scales which may be readily so manipulated by a camera operator, even though an amateur, as to indicate the lens aperture and corresponding shutter speeds which will be available and most desirable in order that the resulting negative, developed in a developer of known characteristics, will afford prints of the character desired, as indicated by the device, on positive material having known characteristics.

The accompanying drawings illustrate an embodiment of my invention:

Fig. 1 is a plan;

Fig. 2 a diametrical section; and

Fig. 3 a graph indicating theoretically perfect density characteristics of a negative material under similar exposures and differing developments.

In the drawings 10 indicates a base having a central fixed portion 11. Revolvably mounted on base 10 are two discs or rings 12 and 13 so arranged as to have exposed annular portions 12' and 13', respectively, surrounding portion 11 of base 10.

On the exposed face of portion 11 of the base 10, I place a series of scales A, B, C, etc., which, for convenience, I shall call "grey" scales. Each of these scales varies with incremental uniformity from deep dark at one end to white, or clear, at the other end, and while these scales may be in any color, I prefer a range from black at one end to white at the opposite end. These scales A, B, C, etc., vary in length (arbitrarily if desired), though I consider it desirable, from a practicable standpoint, that the longest scale be equal in length to the length on the light-value scale to which I shall refer, which represents the brightness ratio of the light source impressed upon the negative material when given the maximum useful exposure and minimum complete development and reproducible through that negative on normal, positive material as a full scale print.

Ring 12 carries a light-value scale L on its exposed face 12' and a lens aperture ($f$ value) scale F. Ring 13 carries, on its exposed face 13' an exposure-time scale T. Base 10 carries a film-speed scale S, which is most conveniently arranged beyond scales L, F, and T. The radial arrangement of the several scales is not material and it will, of course, be understood that a series of straight scales would be equivalent.

An arbitrary length may be assigned for any one of the scales T, F, and L and from that length, the length of the other two is established as follows:

All of these scales are based on the natural logarithms (base 10) of the number chosen. In practical photography a light intensity range of $\frac{1}{10}$ of a foot-candle to 1000 foot-candles is all that is ordinarily found useful. Expressed logarithmically, this is a range from 1 to $10^4$. Ordinary shutter speeds range from $\frac{1}{1000}$ second to 100 seconds and, logarithmically, this is a range from 1 to $10^5$. Ordinary lens apertures range from 1.0 to 100.0 and, logarithmically, the light flux passing therethrough has a range from 1 to $10^4$ because the amount of light passing therethrough varies as the squares of the diameters of the apertures. Consequently, the length of scale L from $\frac{1}{10}$ to 1000 should be the same as the length of scale F from 1 to 100, with equal spacings between 1–2, 2–4, 4–8, 8–16, 16–32, 32–64, and 64–128 and other values logarithmically spaced. The length of scale T from $\frac{1}{1000}$ to 100 should be $\frac{5}{4}$ the length of scales L and F, with equal spacings between $\frac{1}{1000}$–$\frac{1}{100}$; $\frac{1}{100}$–$\frac{1}{10}$; $\frac{1}{10}$–1; 1–10; 10–100; 100–1000; etc., (this scale is based on second intervals and for times of one minute or more the markings are expressed in minutes on Fig. 1).

Scale S may be of any desired length and subdivisions and placed arbitrarily relative to scales A, B, C, etc. Its equal subdivisions may be in either arithmetic or geometric progression. The significance and utility of this scale will appear later.

The character of a positive print from a photographic negative is, of course, dependent upon several variable factors:

(1) The sensitivity of the unexposed negative;
(2) The quantity of light to which various portions of the area of the negative is exposed;
(3) The rate of imposition of light;
(4) The extent and rate of development of the negative;
(5) The sensitivity of the positive material;
(6) The quantity of light imposed on the positive through the negative (dependent upon negative density);
(7) The rate of imposition of light on the positive through the negative; and
(8) The extent and rate of development of the positive.

It is apparent that, in order to obtain a positive print having a desired tone gradient, it is highly important that the negative shall possess an appropriate density gradient and that a properly developed negative produced under any given light-source may be determined by a proper selection of lens aperture and shutter speed.

One method of indicating film density is by the logarithm of the reciprocal of the ratio of transmission of light through the negative. That is, a negative which has a silver deposit through which but $\frac{1}{10}$ of the light striking it may pass is said to have a density of 1. Contrast can be defined mathematically as the ratio of increase of density of a negative to the increase of the logarithm of the quantity of light required to produce this density. The symbol used for this expression is the Greek letter "gamma." A gamma of $\frac{1}{6}$ would indicate that increase of 10 light-time-units of exposure were required to give an increase of density of 1.0 (curve Y, Fig. 3).

If successive portions of a piece of film be exposed to different quantities of light in logarithmic steps, say from 1 light-time-unit to 1000 light-time-units, and then developed for a specific time, its successive exposed portions will have differing densities, the values of which may be plotted as the function of exposure to define a curve (Fig. 3).

Several such curves plotted for a given negative material will establish the exposure and developing characteristics thereof, as indicated in Fig. 3.

Positive material is correlated to the negative in terms of negative density; that is to say, the minimum negative density required to render the positive material white when a transparent area of the negative will render the positive material black.

Assuming that the positive material which is to be used will register as white all negative densities greater than 1.0 (with printing exposure constant) it is apparent that the development, which is indicated by curve Y (Fig. 3), a gamma of 1.0 will reproduce but 10 light-units on the positive material. The number of light-units reproducible by a specific gamma on positive material of a known negative density can be expressed by the formula $$\text{gamma} = \frac{\text{negative density range of positive material}}{\text{logarithm of light units}}$$

The grey scales of my exposure calculator are a visual representation of the tonal range reproducible on an average positive material (in this case positive material whose negative density range is 1.0) by the commonly used gammas.

Tone gradient scale A (Fig. 1) represents a gamma of 0.5. For printing on positive material whose negative density range is 1.0, this gamma has an effective light intensity range of approximately 1 to 100. Therefore, tone gradient scale A should have a length approximating the corresponding portion (1 to 100) of the light value scale L.

Similarly, the lengths of other tone gradient scales B, C, etc., are established for other gamma values. Conveniently, the black ends of the tone gradient scales are aligned.

In order to correlate the several scales, the scale maker will determine experimentally, with a selected make of film commonly found on the market using the film manufacturer's developer, the developing times required to give selected gamma values. From the graphs of these tests (Fig. 3) can be determined the number of light-time-units exposure required to give a selected negative density, say 1.0, which is the negative density range of average positive material.

According to Fig. 3, a gamma of 0.5 indicates that tone scale A represents the contrast in the developed negative exposed to a maximum of 100 light-time-units. Fig. 3 has been highly idealized and is presented merely to facilitate description of my invention.

The total exposure is the product of time and the intensity of the light striking the film (not striking the lens).

Total exposure on film=(time of exposure) × (intensity of light on film).

Knowing the light intensity striking the lens, the light striking the film may be computed by the formula:

$$E \text{ equals } pi \text{ over } 4 \times B \times 1 \text{ over } f^2$$

E equals the intensity of the light striking the film, B equals the light intensity of the image object, and $f$ equals the effective aperture of the lens.

This formula only satisfies a condition for the paraxial ray of a single lens. In practical photography the lenses used suffer from losses due to inter-reflection between surfaces and the angle of the incidence of the principal rays, therefore compensations have to be made to this formula. These compensations, for the purpose of calibrating the device, are determined experimentally and incorporated in the calibration.

Therefore, under the assumption of the necessity of 100 light-time-units to produce a film density of 1.0 (gamma 0.5, Fig. 3), we have $$100 \text{ equals } E.t$$

or $$100 \text{ equals } \frac{pi}{4} \cdot B \cdot \frac{1}{f}2.t$$

Substituting voluntary values for B and $f$ and solving for $t$, $$100 \text{ equals } \frac{pi}{4} \cdot 100 \cdot \frac{1}{2} \cdot t$$

and using 0.8 for $$\frac{pi}{4}$$

(which is close enough for photographic purposes) $t$ equals 5 seconds.

In other words, on the film tested (Fig. 3) developed to a gamma of 0.5 at lens stop $f^2$ it requires an exposure of 5 seconds to render as a density of 1.0 an object reflecting 100 light-timeunits. This density is sufficient to render average positive material white when some transparent area of the negative renders the positive material black.

If the scales of the calculator are so aligned as to satisfy the above calculations, a mark 0 may be placed on scale T to coordinate with some mark on scale S (1, Fig. 1). Mark 1 will indicate the particular film as described above. Other makes of films (negative material) are similarly tested and other marks on scale S are identified as indicating those particular films. Of course, it will be noted that if my device is desired for use only in connection with one particular make of film, no extended film speed scale S would be necessary. That is a single mark to which mark 0 on scale T is to be set.

The use of the indicator is as follows:

The camera operator, upon purchase of film (negative material) is advised by the manufacturer as to their respective speeds of sensitivities and of the developer recommended.

In preparing to make an exposure, he will measure, by any one of several instruments available on the market, the light intensity units reflected from the clear white and other less light surfaces of the scene in which he is particularly interested, thereby learning the available light intensity.

A fully lighted white surface will, of course, reflect the greatest amount of light and should be rendered in the positive as white. The film therefore requires a film density sufficient to render this area as white when the transparent portions of the negative are rendered a deep black on the print. Let us say that this light intensity is 100 light-units. The operator therefore sets reading 100 on scale L in alignment with the white end of the gradient scale A (Fig. 1) and sets scale T with its mark 0 opposite the marking on scale S which is designated for the make of film being used (say as indicated in Fig. 1). Somewhere there will be designations on scales T and F which will align, thereby indicating the lens aperture and corresponding shutter speed which should be used. In the instance selected above (Fig. 1), aperture 2 at 5 seconds, or aperture 4 at 20 seconds, or aperture 8 at 80 seconds, will be available. The negative thus exposed is then developed to the contrast (gamma) indicated by tone gradient scale A (in this instance a gamma of 0.5). The resulting negative will then afford prints on average positive material (in this case positive material having a negative density range of 1.0) of the character indicated by tone gradient scale A; those objects in the original scene reflecting 100 light-intensity-units as white, those objects reflecting 1 or less light-intensity-units as black.

The tone of other objects in the scene as they will be reproduced on the positive may be determined by measuring the light-intensity-units reflected from them, locating that value on scale L, and then observing the tone of scale A adjacent to that value.

The effect of greater negative contrast (gamma) is to diminish the range of light intensities reflected from the scene which may be rendered on the positive material. The user of the calculator may determine this effect before exposure by reference to tone gradient scales A, B, C, etc. The reading from a fully lighted white surface (in this case 100 light-intensity-units) as indicated by value 100 of scale L is aligned with the white end of one of the other tone gradient scales in a manner similar to that shown in Fig. 1. Mark 0 remains aligned with that mark of scale E originally designated for this film. The light-intensity-units reflected from objects in the scene are then compared to the tone gradient scale by locating their values on scale L and observing aligned tone values of scales A, B, and C adjacent to the values.

If the user finds this increased negative contrast a better interpretation of the scene, the available apertures and their corresponding shutter speeds are indicated by reference to scales F and T, respectively. The negative is then developed to the gamma indicated by the tone gradient scale. Prints from this negative on average positive material will be of a character indicated by that tone gradient scale.

I claim as my invention:

1. An indicator for photographer's use, comprising the following lengthwise co-ordinable elements:

(a) A light value element having graduations thereon to indicate logarithmically various light values, (b) A lens aperture element having graduations thereon to indicate logarithmically relative camera-lens aperture diameters, (c) A shutter speed element having graduations thereon to indicate logarithmically shutter speeds, wherein the length of that portion of element (a) indicating $\frac{1}{10}$ to 1000 and the length of that portion of element (b) indicating 1 to 100 are each $\frac{4}{5}$ of the length of that portion of element (c) indicating $\frac{1}{1000}$ to 100, (d) A tone gradient indicator element bearing an extended shaded area incrementally shaded from dark to light and incrementally indicating tone graduations, and (e) An indicator element having graduations thereon to indicate negative-material sensitivity and co-ordinated with the tone gradient indicator element, the elements (a)—(b), element (c) and indicator elements (d)—(e) being relatively shiftable lengthwise to various relative positions, substantially as and for the purpose set forth.

2. An indicator for photographer's use, comprising the following lengthwise co-ordinable elements:

(a) A light value element having graduations thereon to indicate logarithmically various light values, (b) A lens aperture element having graduations thereon to indicate logarithmically relative camera-lens aperture diameters, (c) A shutter speed element having graduations thereon to indicate logarithmically shutter speeds, wherein the length of that portion of element (a) indicating $\frac{1}{10}$ to 1000 and the length of that portion of element (b) indicating 1 to 100 are each $\frac{4}{5}$ of the length of that portion of element (c) indicating $\frac{1}{1000}$ to 100, (d) A tone gradient indicator element bearing an extended shaded area incrementally shaded from dark to light and incrementally indicating tone graduations, and (e) An indicator element having graduations thereon to indicate negative-material sensitivity and co-ordinated with the tone gradient indicator element, the elements (a) and (b) being fixed relative to each other but shiftable lengthwise as a unit relative to indicator elements (d) and (e), and the element (c) being shiftable lengthwise relative to the elements (a) and (b) and indicator elements (d) and (e), substantially as and for the purpose set forth.

3. An indicator for photographer's use, comprising the following lengthwise co-ordinable elements:
(a) A light value element having graduations thereon to indicate logarithmically various light values,
(b) A lens aperture element having graduations thereon to indicate logarithmically relative camera-lens aperture diameters,
(c) A shutter speed element having graduations thereon to indicate logarithmically shutter speeds, wherein the length of that portion of element (a) indicating $\frac{1}{10}$ to 1000 and the length of that portion of element (b) indicating 1 to 100 are each $\frac{4}{5}$ of the length of that portion of element (c) indicating $\frac{1}{1000}$ to 100,
(d) A tone gradient indicator element having an extended shaded area incrementally shaded from dark to light and incrementally indicating tone graduations, and
(e) An indicator element having graduations thereon to indicate negative-material sensitivity and co-ordinated with the tone gradient indicator, the elements (a) and (b) being fixed relative to each other, and the indicator elements (d) and (e) being fixed relative to each other, but (a), (b), and (c) and (d), (e) being relatively shiftable to various positions of lengthwise co-ordination, substantially as and for the purpose set forth.

4. An indicator for photographer's use, comprising the following lengthwise co-ordinable elements:
(a) A light value element having graduations thereon to indicate logarithmically various light values,
(b) A lens aperture element having graduations thereon to indicate logarithmically relative camera-lens aperture diameters,
(c) A shutter speed element having graduations thereon to indicate logarithmically shutter speeds, wherein the length of that portion of element (a) indicating $\frac{1}{10}$ to 1000 and the length of that portion of element (b) indicating 1 to 100 are each $\frac{4}{5}$ of the length of that portion of element (c) indicating $\frac{1}{1000}$ to 100,
(d) A tone gradient indicater element bearing an extended shaded area incrementally shaded from dark to light and incrementally indicating tone graduations, the elements (a)—(b), element (c) and indicator element (d) being relatively shiftable lengthwise to various relative portions, substantially as and for the purpose set forth.

RICHARD WEAVER.